United States Patent
Kagarlitsky et al.

(10) Patent No.: US 12,526,255 B2
(45) Date of Patent: Jan. 13, 2026

(54) METHOD AND DEVICE FOR MONITORING DATA OUTPUT BY A SERVER

(71) Applicant: F5, Inc., Seattle, WA (US)

(72) Inventors: Mirit Kagarlitsky, Ramat Hasharon (IL); Tal Steinherz, Ramat Hasharon (IL)

(73) Assignee: F5, Inc., Seattle, WA (US)

( * ) Notice: Subject to any disclaimer, the term of this patent is extended or adjusted under 35 U.S.C. 154(b) by 818 days.

(21) Appl. No.: 17/293,330

(22) PCT Filed: Nov. 13, 2019

(86) PCT No.: PCT/IB2019/059750
§ 371 (c)(1),
(2) Date: May 12, 2021

(87) PCT Pub. No.: WO2020/100061
PCT Pub. Date: May 22, 2020

(65) Prior Publication Data

US 2022/0014501 A1    Jan. 13, 2022

Related U.S. Application Data

(60) Provisional application No. 62/760,294, filed on Nov. 13, 2018.

(51) Int. Cl.
*H04L 9/40*    (2022.01)
(52) U.S. Cl.
CPC ...... *H04L 63/0245* (2013.01); *H04L 63/0227* (2013.01); *H04L 63/12* (2013.01); *H04L 63/1408* (2013.01)

(58) Field of Classification Search
CPC . H04L 63/0245; H04L 63/0227; H04L 63/12; H04L 63/1408; G06F 21/554
See application file for complete search history.

(56) References Cited

U.S. PATENT DOCUMENTS 8,219,766 B1 *  7/2012  Orcutt ................ G06F 11/1446
                                                707/640
8,776,206 B1 *  7/2014  Goldstein .......... H04L 63/0227
                                                709/224
(Continued)

FOREIGN PATENT DOCUMENTS

CN          106446707 A       2/2017

OTHER PUBLICATIONS

Sankalpa et al., On Implementing a Client-Server setting to prevent the Browser Reconnaissance and Exfiltration via Adaptive Compression of Hypertext (BREACH) Attacks, 2016, IEEE.*

(Continued)

*Primary Examiner* — David Garcia Cervetti
(74) *Attorney, Agent, or Firm* — Troutman Pepper Locke LLP

(57) ABSTRACT

A computer implemented method of monitoring data output by a server over a network is provided, in which the server is arranged to store data. The method includes analysing, by a computing device, outgoing data from the server sent over the network; filtering, by the computing device, a portion of the outgoing data to determine a remaining portion of the outgoing data; analysing, by the computing device, the remaining portion of the outgoing data to determine the amount of information in the remaining portion of the outgoing data; and performing, by the computing device, a predetermined action if the amount of information in the remaining portion of the outgoing data is over a threshold.

20 Claims, 5 Drawing Sheets

(56) References Cited

U.S. PATENT DOCUMENTS

| | | | |
|---|---|---|---|
| 9,565,202 B1* | 2/2017 | Kindlund | H04L 63/145 |
| 10,079,835 B1* | 9/2018 | Dodke | H04L 63/0245 |
| 10,268,836 B2* | 4/2019 | Ukil | G06F 21/6245 |
| 2005/0271207 A1* | 12/2005 | Frey | H04L 9/0668 |
| | | | 380/263 |
| 2007/0041608 A1* | 2/2007 | Maeno | H04N 1/00838 |
| | | | 382/100 |
| 2008/0307524 A1* | 12/2008 | Singh | H04L 63/1416 |
| | | | 726/22 |
| 2009/0232000 A1* | 9/2009 | Watanabe | H04L 43/00 |
| | | | 370/235 |
| 2009/0300759 A1* | 12/2009 | Wang | H04L 63/1458 |
| | | | 726/22 |
| 2013/0004090 A1* | 1/2013 | Kundu | G06Q 20/20 |
| | | | 382/284 |
| 2015/0269386 A1* | 9/2015 | Khetawat | G06F 21/62 |
| | | | 726/1 |
| 2016/0149862 A1* | 5/2016 | Kilgallon | H04L 63/0245 |
| | | | 726/11 |
| 2018/0123955 A1* | 5/2018 | Moore | H04L 63/0236 |
| 2018/0324146 A1* | 11/2018 | Meriac | H04W 4/80 |
| 2019/0012476 A1* | 1/2019 | Dorogoy | G06F 21/60 |
| 2023/0376581 A1* | 11/2023 | Shear | G06V 40/45 |
| 2024/0223578 A1* | 7/2024 | McNelly | H04L 63/1416 |
| 2024/0378309 A1* | 11/2024 | Bhattacharya | G06F 21/602 |
| 2024/0406210 A1* | 12/2024 | Sellars | G06F 9/45558 |

OTHER PUBLICATIONS

Allawi et al., MLDED: Multi-Layer Data Exfiltration Detection System, 2015, IEEE.*

International Search Report, Application No. PCT/IB2019/059750, Mailed Dec. 24, 2019, 2 pages.

Durkota et al., "Optimal Strategies for Detecting Data Exfiltration by Internal and External Attackers" Oct. 4, 2017, Advances in Biometrics: International Conference, ICB 2007, Seoul, Korea, Aug. 27-29, 2007; XP047450519, ISBN: 978-3-540,74549-5, 22 pages.

European Patent Office, Extended European Search Report, Application No. 19884623.0, mailed Sep. 19, 2022, 11 pages.

Sultan et al., "Detecting data semantic: A data leakage prevention approach" 2015 IEEE Trustcom/BigDataSE/ISPA, vol. 1, Aug. 20, 2015, XP032819745, DOI: 10.1109/TRUSTCOM.2015.464, 8 pages.

Yoshihama et al., "Web-based Data Leakage Prevention" Sep. 15, 2011, XP055234468, Retrieved from URL: http://citeseerx.ist.psu.edu/viewdoc/download;jsessionid=5A050A63CB61A931349DB6FACEE97D9E?doi=10.1.1.207..5902&rep=rep1&type=pdf, 16 pages.

* cited by examiner

METHOD AND DEVICE FOR MONITORING DATA OUTPUT BY A SERVER

FIELD

The present disclosure relates to a method and device for monitoring data output by a server. Embodiments of the present disclosure can identify potential data breaches in a server (or any data repository) included in a system. Specifically, embodiments of the present disclosure may relate to software application which monitors data leaving a server, so as to detect and/or prevent a possible data breach.

BACKGROUND

A data breach is the unauthorised (or unwanted or unintentional) output of data (e.g. confidential or sensitive information) from a device (i.e. the 'exfiltration' of the data), such as a server or any data repository. For example, a malicious user (i.e. a hacker), operating one device can connect with another device over a network, and cause that device to transmit private/confidential/sensitive information to their device or a third party device.

Data breaches can have devastating consequences, with the potential for large fines from national regulators (e.g. as a result of GDPR) as well as significant reputational damage. Recent figures show that the average cost of a major data breach is in the region of $50-350 million. A significant proportion of this cost/damage relates to loss of intellectual property (IP), "reconstructions" of systems and compensating customers.

A number of existing methods attempt to prevent such data breaches from occurring. Most conventional approaches for data protection (anti-theft/exfiltration) are focused on detecting either the attacker or the act of penetration first. Such detection-based methods are trying to identify where an attacker is operating on a network using behaviour analysis tools or other techniques such as honeypots (i.e. by providing data which appears to contain information of value to a hacker, but which is monitored so that the hacker can be detected and blocked).

However, these existing methods generally have high false positive rates. Furthermore, relying on detection requires significant expertise and heavy maintenance, and it does not typically protect against new attacker innovation and practices.

Other popular methods are often known as data loss\leakage prevention (DLP) tools. In this case, outgoing pieces of data are analysed in an attempt to identify unauthorized transitions based on preconfigured and\or machine learnt rules.

The major drawback of this approach relate to the rule-based policies which have limited effectiveness and are often expensive and labour-intensive to implement and maintain. In other words, existing DLP tools usually require pre classification of protected data or present an unsatisfying detection to false alarm ratio. They also do not protect against data being exfiltrated in a covert channel as they can only handle structured data.

SUMMARY

The aspects of the disclosed embodiments are directed to provide a DLP tool (i.e. a method of identifying and/or preventing potential data breaches) that overcomes problems associated with conventional DLP tools.

According to an aspect of the disclosed embodiments, there is provided a computer implemented method of monitoring data output by a server over a network, wherein the server is arranged to store data, the method comprising: analysing, by a computing device, outgoing data from the server sent over the network; filtering, by the computing device, a portion of the outgoing data to determine a remaining portion of the outgoing data; analysing, by the computing device, the remaining portion of the outgoing data to determine the amount of information in the remaining portion of the outgoing data; and performing, by the computing device, a predetermined action if the amount of information in the remaining portion of the outgoing data is over a threshold.

In some embodiments, the filtering comprises filtering data of the server that has been sent over the network previously to determine the remaining portion of the outgoing data.

In some embodiments, the method further comprises analysing, by the computing device, the server to categorise the data stored in the server into a plurality of data blocks; storing, by the computing device, record data indicating whether the data blocks stored in or generated by the server have been sent over the network previously; wherein the filtering comprises filtering those data blocks that have been sent over the network previously to determine the remaining portion of the outgoing data.

In some embodiments, the method further comprises analysing, by the computing device, the server to categorise the data stored in the server into a plurality of data blocks; storing, by the computing device, copies or templates of data blocks stored in or generated by the server that have been sent over the network previously; wherein the filtering comprises filtering the parts of the data blocks that have been sent over the network previously to determine the remaining portion of the outgoing data.

In some embodiments, the filtering data of the server that has been sent over the network previously comprises at least one of: filtering data that has been sent before by the server to any recipient and filtering data that has been sent before by the server to an intended recipient of the outgoing data and\or filtering data that has been sent before by the server as a response to the same kind of request.

In some embodiments, the filtering data of the server that has been sent over the network previously comprises considering data that has been sent by the server in a predetermined time period.

In some embodiments, the predetermined action is performed if the accumulated amount of information in the remaining portion of a set of outgoing data is over a threshold.

In some embodiments, the method further comprises analysing, by the computing device, the outgoing data to determine a data format of at least a portion of the outgoing data; changing, by the computing device, the data format of a portion of the outgoing data; wherein the filtering comprises filtering the portion of the outgoing data with a changed data format to determine the remaining portion of the outgoing data.

In some embodiments, the analysing the outgoing data to determine a data format of at least a portion of the outgoing data comprises checking header information of the outgoing data.

In some embodiments, the changing the data format of a portion of the outgoing data comprises altering (e.g. scrambling) at least part of that portion of the outgoing data.

In some embodiments, the method further comprises analysing, by the computing device, the outgoing data to determine a portion of the outgoing data that comprises protocol header values; wherein the filtering comprises filtering the portion of the outgoing data that comprises protocol header values to determine the remaining portion of the outgoing data.

In some embodiments, the method further comprises analysing, by the computing device, the outgoing data to determine a portion of the outgoing data that is deemed to not to be a security risk; wherein the filtering comprises filtering the portion of the outgoing data that is deemed to not to be a security risk to determine the remaining portion of the outgoing data.

In some embodiments, the analysing the outgoing data to determine the portion of the outgoing data that is deemed to not to be a security risk comprises using an external trusted model to determine a portion of the outgoing data that is associated with a genuine response to a verified user request for data.

In some embodiments, the analysing the remaining portion of the outgoing data to determine the amount of information in the remaining portion of the outgoing data comprises: applying, by the computing device, a compression or compression-like algorithm to the remaining portion of the outgoing data to obtain a compressed remaining portion of the outgoing data; wherein the amount of information is determined based on a size of the compressed remaining portion of the outgoing data.

In some embodiments, the analysing the remaining portion of the outgoing data to determine the amount of information in the remaining portion of the outgoing data comprises applying, by the computing device, an Edit Distance-like algorithm. For example, such an Edit Distance-like algorithm can be used to determine change between two similar data blocks, for example to count the number of bytes that change between two similar data blocks. In other words, instead of (or prior to) determining the remaining information using compression and the "difference" to a similar block\payload\file etc. that was already sent over the network can be used.

In some embodiments, the method further comprises comparing, by the computing device, the compressed remaining portion of the outgoing data to a predetermined threshold, and performing, by the computing device, the predetermined action if the size of the compressed remaining portion of the outgoing data is over the predetermined threshold.

In some embodiments, the predetermined threshold comprises an absolute number.

In some embodiments, the absolute number is determined based on a threshold related to an amount of human digestible information. The amount of human digestible information may, for example, be the maximum amount of information that a human user my retrieve for authentic work (and could vary between applications).

In some embodiments, the predetermined threshold is determined based on a ratio of the size of the compressed remaining portion of the outgoing data and a total size of the data stored in the server.

In some embodiments, the predetermined threshold is determined based on a ratio of the size of the compressed remaining portion of the outgoing data and a compressed size of the data stored in the server.

In some embodiments, the threshold may comprise a different number for each recipient, request kind, time related parameters and other properties or a combination of them.

In some embodiments, a threshold may be machine-learned from the profile of previous communications by the computing device on continuous basis.

In some embodiments, a threshold and comparing phase refers to the size of the accumulated remaining portion of a set of outgoing data.

In some embodiments, the threshold may change according to the current level of risk estimated by an external module.

In some embodiments, the threshold could be used in conjunction with other parameters. For example, the threshold could be used in conjunction with other parameters and tests on the characteristics of the data (in comparison with a user profile, for example), metadata (like who is the user or recipient's IP address etc.) and even insights from the incoming communication. For example, the final decision may take into account the geolocation of the recipient. In another case the existence of personal information or classified data in the content may actually lower the threshold for any practical aspect.

In some embodiments, the analysing the remaining portion of the outgoing data to determine the amount of information in the remaining portion of the outgoing data comprises: applying, by the computing device, an algorithm to the remaining portion of the outgoing data to obtain an indication of the information density of the remaining portion of the outgoing data; wherein the amount of information is determined based on a size of the information density remaining portion of the outgoing data and/or a delta of information from a previous copy.

In some embodiments, the predetermined action comprises: providing, by the computing device, an alert that there is a potential data breach.

In some embodiments, the providing the alert comprises: sending, by the computing device, information indicating the alert to an external device.

In some embodiments, the providing the alert comprises: displaying, on a display of a computing device, information indicating the alert.

In some embodiments, the predetermined action comprises: sending, by the computing device, information indicating that there is a potential data breach to the server.

In some embodiments, the predetermined action comprises: storing, by the computing device, information indicating that there is a potential data breach.

In some embodiments, the computing device is arranged to receive a copy of all outgoing data from the server sent over the network.

In some embodiments, the computing device is arranged to be installed between the server and the network.

In some embodiments, the method further comprises receiving, by the computing device, outgoing data from the server that is intended to be sent over the network; and sending, by the computing device, the outgoing data to the network if the predetermined action is not performed; wherein the predetermined action comprises not sending the outgoing data to the network.

In some embodiments, the computing device comprises part of the server. For example, it could be a software appliance on a virtual server.

In some embodiments, the predetermined action comprises the computing device causing the server not to send the outgoing data to the network. For example, the computing device could interfere with the network session to effectively block the sending of the outgoing data.

In some embodiments, the method further comprises analysing, by the computing device, a request for data sent from a second computing device to the server over the network; determining, by the computing device, context information relating to the request; and determining the threshold on the basis on the context information.

In some embodiments, the context information relates to any one or combination of a name of a user who initiated the request, an IP address of the second computing device, any unique communication identifier of the second computing device, the date and\or time of the day of a current session, a specific service\path\request name in the server that the second computing device was requesting.

In some embodiments, the threshold is determined in relation to a total amount of accumulated information over several sessions sharing the same context information or a same set of context information.

According to an aspect of the disclosed embodiments, there is provided a computer-readable medium having computer-executable instructions to cause one or more processors of a computing device to carry out the method of any one of the above embodiments.

According to an aspect of the disclosed embodiments, there is provided a computing device comprising: one or more processors; and a memory operable to store data output by a server over a network, the memory being further operable to store operating instructions to control the one or more processors to: analyse the outgoing data from the server sent over the network; filter a portion of the outgoing data to determine a remaining portion of the outgoing data; analyse the remaining portion of the outgoing data to determine the amount of information in the remaining portion of the outgoing data; and perform a predetermined action if the amount of information in the remaining portion of the outgoing data is over a threshold.

In some embodiments, the memory is further operable to store operating instructions to control the one or more processors to: provide an alert that there is a potential data breach if the amount of information in the remaining portion of the outgoing data is over a threshold.

In some embodiments, the computing device comprises a communications interface, and wherein the memory is further operable to store operating instructions to control the one or more processors to send information indicating the alert to an external device via the communications interface.

In some embodiments, the computing device comprises a display, and wherein the memory is further operable to store operating instructions to control the one or more processors to display information indicating the alert on the display.

In some embodiments, the computing device comprises a communications interface operable to receive a copy of all outgoing data from the server sent over the network.

In some embodiments, the computing device is arranged to be installed between the server and the network, wherein the computing device comprises a communications interface operable to receive all outgoing data from the server sent over the network, and wherein the memory is further operable to store operating instructions to control the one or more processors to: receive, via the communications interface, outgoing data from the server that is intended to be sent over the network; and sending, via the communications interface, the outgoing data to the network if the predetermined action is not performed; wherein the predetermined action comprises the communications interface not sending the outgoing data to the network.

In some embodiments, the computing device comprises part of the server, and wherein the predetermined action comprises the server causing the server not to send the outgoing data to the network.

According to an aspect of the disclosed embodiments, there is provided a computer implemented method of manipulating data output by a server over a network so as to ameliorate risk of covert messages or leaks, or manipulations within the data output being sent over the network, the method comprising: analysing, by a computing device, outgoing data from the server sent over the network to determine a data format of at least a portion of the outgoing data; changing, by the computing device, the data format of a portion of the outgoing data.

In some embodiments, the analysing the outgoing data to determine a data format of at least a portion of the outgoing data comprises checking header information of the outgoing data.

In some embodiments, the changing the data format of a portion of the outgoing data comprises altering (e.g. scrambling) at least part of that portion of the outgoing data.

According to an aspect of the disclosed embodiments, there is provided a computer-readable medium having computer-executable instructions to cause one or more processors of a computing device to carry out the method of any one of the above embodiments.

According to an aspect of the disclosed embodiments, there is provided a computing device comprising: one or more processors; and a memory operable to store data output by a server over a network, the memory being further operable to store operating instructions to control the one or more processors to: analyse outgoing data from the server sent over the network to determine a data format of at least a portion of the outgoing data; changing, by the computing device, the data format of a portion of the outgoing data.

BRIEF DESCRIPTION OF THE DRAWINGS

Embodiments of the present disclosure will now be described, by way of example only, with reference to the accompanying drawings, in which.

DESCRIPTION OF THE EMBODIMENTS

Embodiments of the present disclosure can provide a method of identifying a potential data breach by monitoring outgoing data from a device (e.g. a server or data repository), removing a portion of the outgoing data that can be assumed to be "safe" (e.g. data that does not contribute new information to an attacker), analysing the remaining data to determine the amount of information and then taking an action (e.g. alert user, prevention, etc.) if the amount of information is over some threshold. The amount of information in the remaining data can in some embodiments be considered to be the amount of "pure" information in the remaining data, rather than the byte count of the remaining data. The amount of "pure" information may be calculated by considering the information density of the remaining date.

Hence, some embodiments may calculate the share of pure information in outgoing traffic to identify actual data loss or exposure.

Some embodiments of the present disclosure do not attempt to identify a breach made by a known attack method. Instead, such embodiments monitor all outgoing traffic, discount a portion of "safe" data, and then determine how much information is left in the remaining data. As discussed in more detail below, this can provide a deterministic approach that can be fully automated. Such approaches are also threat agnostic and can be easy to implement compared to conventional methods.

Figure 1:
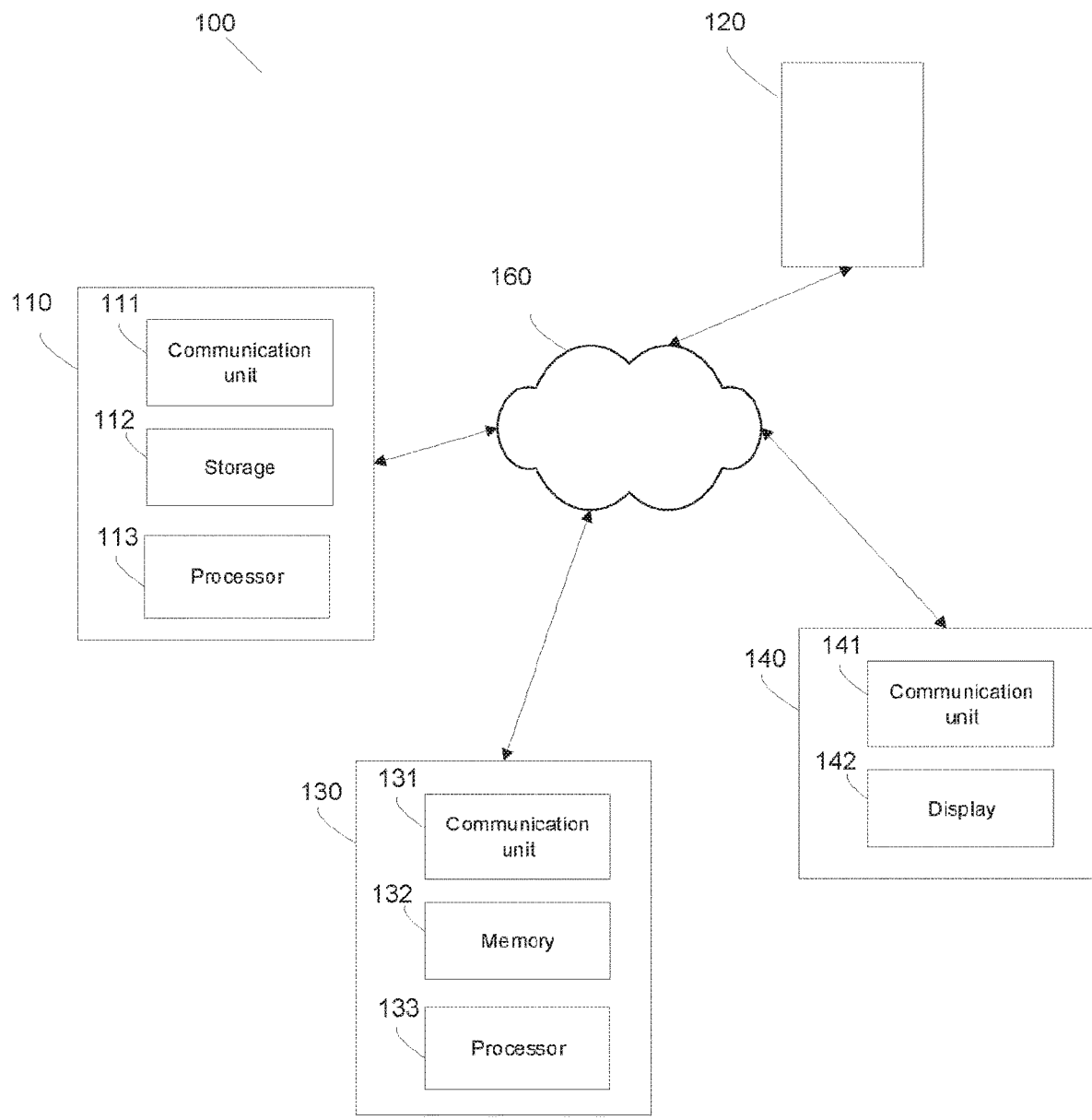
FIG. 1 shows a schematic illustration of a system according to a first embodiment of the present disclosure.

FIG. 1 shows a system 100 according to a first embodiment. The system 100 comprises a first device 110, a second device 120, a third device 130, and a fourth device 140. The devices are electronic devices capable of communicating over the network 160. Specifically, the first device 110 can communicate with each of the second device and the third device over the network 160, while the third device 130 is also able to communicate with the fourth device 140 over the network 160. In this embodiment, the device 130 is accessible to all outgoing communication from the first device 110.

In the examples discussed below, the second device 120 requests data from the first device 110, and the first device 110 responds by generating and sending the data. However, the disclosed embodiments are not limited to this. In other examples, the first device can transmit data to the second device without receiving a request first. For example, the first device could be a compromised (i.e. hacked) server which is outputting information automatically It will be appreciated that in practical implementations of embodiments of the present disclosure there may be many such devices, but four such devices will be described in relation to FIG. 1 for ease of explanation. In addition, in other embodiments there would be fewer than four devices (e.g. two devices) connected to the network. This could be achieved, for example, by combining the functionality of the first, third and fourth electronic devices 110, 130, 140 into a single device. However, by providing the functionality of the third device 130 separately to the first device 110, security can be increased. This is because a hacker would have to successfully penetrate the security of both the first device 110 and the third device 130 in order to extract information without being identified, as will be apparent from the following discussion.

In this specific embodiment, each device in FIG. 1 is shown as a single entity for ease of illustration. However, it will be appreciated that the functionality of each device may in other embodiments be split over more than one device. In other words, generally speaking, each device in FIG. 1 could be a single device or a distributed device.

The first device 110 comprises a communication unit 111, a storage 112, and a processor 113. In this embodiment, the first device 110 is a server hosting a website. However, embodiments of the present disclosure are not limited to this. In other embodiments, the first device 110 could be any type of electronic device (e.g. smartphone, PC, tablet, laptop etc.) capable of storing any type of data (e.g. videos, music, documents, personal data etc.). Furthermore, in some embodiments the first device does not comprise a storage 110. Instead, the processor of the first device is capable of generating new data.

In this embodiment, the communication unit 111 of the first device 110 is configured to communicate with each of the second device 120 and the third device 130. As discussed, in this embodiment, the device 130 is accessible to all outgoing communication from the first device 110.

The storage 112 is configured to store website data relating to the website, e.g. confidential or sensitive data as well as other data that can be freely accessed by members of the public. In other words, the storage 112 is configured to store the data necessary for hosting the website. However, as discussed above, embodiments of the present disclosure are not limited to the hosting of a website, and in other embodiments the storage could store any other type of data (e.g. videos, music, documents, personal data, database records etc.) for transmission to another device or self-usage.

The processor 113 is configured to control the output of the data in the storage 112 via the communication unit 111. In other words, the processor 113 is configured to process requests for data received by the communication unit 111 (e.g. a valid HTTP request) and control the communication unit 111 to output the retrieved data blocks in network packets. Here, for example, data blocks may represent different levels of meaningful, i.e. self contained, pieces of structured\formatted data that serve the associated application or protocol. Examples of such data blocks include complete files, pages etc. in any format that are downloaded or sent by any protocol; complete files that are embedded within other frames like a file in a compressed archive, an object within a document etc., or designated sections within files, pages etc. like HTML elements, textual paragraphs, frames in a video stream etc.

The second device 120 is a device capable of communicating with the first device 110. In this embodiment, the second device is a PC. However, embodiments of the present disclosure are not limited to this and the second device could be any suitable computing device (e.g. server, smartphone, tablet, laptop. etc.).

The third device 130 comprises a communication unit 131, a memory 132, and a processor 133. In this embodiment, the third device 130 is a computing device acting as a monitoring device. However, embodiments of the present disclosure are not limited to this and the third device could be any suitable computing device (e.g. router, server, PC, tablet, laptop. etc.). Furthermore, the computing device may be implemented as a single device or as a distributed device.

The communication unit 131 of the third device 130 is configured to listen to the outgoing communication of the first device 110 and communicate with the fourth device 140 over the network 160. The memory 132 in this embodiment is configured to store record data comprising information indicating which parts of the data stored or produced in the first device 110 have been output by the first device 110. In other words, the memory 132 of the third device 130 stores record data indicating each block of the website data which has been output by the first device 110. This repository data could be the hash of each data block that has been output. Alternatively, it could be another mathematical indicator to simply compare the resemblance of two data blocks.

In this embodiment, the record data simply indicates whether the data block has been output. However, embodiments of the present disclosure are not limited to this. For example, the record data could instead indicate how many times each data block has been output in the last day, how many times each data block has ever been output, or a frequency of output of the data block (e.g. how many times the data block is output per hour, day, week, year etc. on average).

The processor 133 is configured to analyze the data output by the first device 110. As discussed further later, the processor 133 in this embodiment is configured to determine whether a data breach is likely to have occurred by filtering out data which has already been output (which indicates that it is safe to output), and determining how much actual information (i.e. "pure" information) is included in the remaining data. In other words, the processor 133 is configured to determine how much information which has not previously been output has been output in a given data stream, and to determine that a data breach may be occurring if the amount of such information being output is above a predetermined threshold.

While FIG. 1 shows the processor 133 as a separate component of the third device 130, it will be appreciated that in practical implementations of embodiments of the present disclosure, the processor functionality, i.e. the data analysis, can be implemented as a software application being performed by the processor of the first device. Alternatively, the processor could be implemented as a separate hardware component in the first device or in a separate device (e.g. in a device such as a local network area router).

The fourth device 140 comprises a communication unit 141 and a display 142. In this embodiment, the fourth device is a smartphone. However, embodiments of the present disclosure are not limited to this and the fourth device could be any suitable computing device (e.g. server, PC, tablet, laptop. etc.). The display 142 is configured to display a potential data breach warning (i.e. an alert) and any other message or result received from the third device 130 via the communication unit 141.

In addition, some embodiments may not include a fourth device. For example, the third device could include a display, and display the data breach warning and messages or results itself. Alternatively, the third device could simply store data indicating possible data breaches, which can be assessed by a user (or by an algorithm) at a later time.

The network 160 in this embodiment is the Internet. However, embodiments of the present disclosure are not limited to this and any suitable communications technology could be used instead. In addition, while a single network is shown in FIG. 1, embodiments of the present disclosure are not limited to this. For example, in other embodiments, the first device could communicate with the second and third devices over a first network (e.g. the internet), while the third device 130 communicates with the fourth device over a second network (e.g. a cell network, wherein the warning is an SMS message).

This embodiment provides a method for determining whether a data breach is likely to be occurring, based on how much information which has not been output previously in a determined time frame by the first device is being output by that device.

The operation of the embodiment discussed in relation to FIG. 1 will be explained in relation to the flow chart of FIG. 2, which shows operations of the first to third devices.

At step S1, the communication unit 111 of the first device 110 receives a request for data from the second device 120. For example, in normal use, the second device 120 may request access to a particular webpage of the website hosted at the first device 110. However, step S1 is optional. In variants of this embodiment, as well as other embodiments, the first device 110 could send data to the second device 120 without receiving a request for that data and hence step S1 can be skipped.

At step S2, the processor 113 of the first device 110 processes the request for data. Specifically, the processor 113 analyzes the request and retrieves the relevant data blocks from the website data stored in the storage 112. In other words, the processor 113 retrieves the data blocks necessary for providing the requested webpage to the second device 120.

As step S3, the processor 113 controls the communication unit 111 to transmit the retrieved data blocks to the second device 120, to allow the second device 120 to display the requested webpage. The data blocks are sent within network packets making up a data stream, each network packet comprising a header and a payload.

At step S4 the third device 130 'sniffs' the data sent from the first device 110 to the second device 120 in step S3. In other words, the third device 130 also receives a copy of the data sent from the first device 110 to the second device 120. This step corresponds to the third device (e.g. a computing device) analysing outgoing data from the first device 110 (e.g. a server) sent over the network 160.

At step S5, the processor 133 of the third device 130 filters each block of the data stream (i.e. the data sniffed by the third device) by splitting the data stream into first data and second data. The first data is data that the processor 133 considers safe to output. This step corresponds to the third device (e.g. a computing device) filtering (e.g. removing or ignoring) a portion of the outgoing data (i.e. first data) to determine a remaining portion of the outgoing data (i.e. second data).

In this embodiment, the first data is data that has already been output in the last relevant period of time (e.g. day), and is therefore considered safe to output again. In other words, if data has recently already left the first device 110, it can be reasonably assumed that it is safe to leave again, as it does not include any new information (i.e. any information which has not already been output). For example, considering a server hosting web pages, a large portion of the data output from that server will comprise constant graphics (pictures, logos etc.) that make up content of the web pages. From the second time and on that this content is downloaded, it does not provide a data breach risk, and so is filtered by this embodiment. While this data may include sensitive information, in this embodiment once it leaves the system once it is not considered to provide new information when it leaves again.

In some embodiments, the above principle could be applied on a per client basis. In other words, the first data could be data that has already been output in the last relevant period of time (e.g. day) to a specific client (e.g. the second device 120). However, data that has been sent to one client (e.g. the second device 120) would not be considered to be "safe" to send to another client in such embodiments.

In this embodiment, the processor 133 analyzes each data block as a whole (i.e. determines whether the whole block of data has already been output by the first device). However, embodiments of the present disclosure are not limited to this, and in other embodiments the processor determines whether part of each block has previously been output so the second data would only comprise the parts of the blocks that have not been output before.

Furthermore, embodiments of the present disclosure are not limited to determining whether the data block has ever been output. For example, the processor 133 could instead determine whether the data block has been output in a suitable time period (e.g. minute, hour, day, week, month, year etc.), or could instead determine a frequency of output (e.g. on average the data block is output more than ten times per day).

The processor 133 filters out (i.e. ignores) the first data, and retains the second data for step S6.

At step S6, the processor 133 determines how much information is included in the second data. This step corresponds to the third device (e.g. a computing device) analysing the second data (remaining portion of the outgoing data after filtering) to determine the amount of information in the second data.

In this embodiment, the processor 133 performs step S6 by applying an LZ-like compression algorithm to the second data. Applying such a compression algorithm allows the processor 133 to determine a normalised number of bytes of data needed to provide all of the information included in the second data. This can then be compared against external thresholds and/or input to an anomaly analyzer to determine the amount of pure information in outgoing traffic and to identify actual data loss.

As an example, there may be 1 megabyte (MB) of second data. If the compression algorithm can compress this down to 50 KB of data, this would indicate that there is less information than if the compression algorithm can only compress this down to 800 KB.

In other words, this embodiment uses a compression algorithm to see how much the second data could be reduced in size, which gives an indication of information complexity or information density of the second data. For example, data that is all zeros can be much more heavily compressed than information rich data. The goal of the compression is not to compress the second data as such, but to determine how information rich the second data is.

While this embodiment uses an LZ compression algorithm (or an LZ-like compression algorithm), embodiments of present disclosure are not limited to this, and in other embodiments other suitable compression algorithms, or any other type of algorithm capable of determining a measure of the amount of pure information included in the second data, could be used instead. For example, a suitable algorithm may be one that is not a proper compression algorithm, but that is from the same "family" of algorithms. Another option is an Edit Distance-like algorithm to count the number of bytes that change between two similar data blocks.

At step S7, the processor 133 determines whether the amount of information (i.e. number of bytes of compressed data) included in the second data is above a predetermined threshold, and controls the communication unit 131 to transmit a warning to the fourth device 140 if the amount of information is above this threshold. The amount of information is represented by the number of bytes of data resulting from the compression algorithm (e.g. 50 KB or 800 KB as discussed above).

In general, embodiments of the present disclosure may provide other outputs rather than just warnings of potential data breaches. For example, embodiments may provide dashboard functionality (e.g. for display at the fourth device 140) showing the operation of the third device 130. Such information could be provided by information sent from the third device 130 to the fourth device 140. This could enable the fourth device 140 to, for example, show graphs of the overall information over time of data flow and the filtration amounts.

More generally still, step S7 corresponds to the third device performing a predetermined action if the amount of information in the second data (i.e. the remaining portion of the outgoing data after filtering) is over a threshold or the accumulated amount of information in a set of second data is over an adjusted threshold.

In this embodiment, the predetermined threshold is a 10% of the total data stored in the storage. For example, if the total data stored in the storage was 2 MB of data, the processor 133 determined that there was 1 MB of second data (i.e. 1 MB of data that was not output previously in the relevant time period), and the LZ compression algorithm compressed this 1 MB of second data down to 100 KB, then no warning would be issued, because 100 KB as a percentage of 2 MB is only 5%. In contrast, if the compression algorithm only compressed the 1 MB of second data to 500 KB, then a warning would be issued because this is 25% of the 2 MB total which is above the 10% threshold.

While the threshold in this embodiment is 10% of the total amount of data stored, embodiments of the present disclosure are not limited to this. For example, a different percentage (e.g. 1%) could be used. Alternatively, the threshold could be a percentage (e.g. 10%) of the non-compressed second data, instead of the total data. In another alternative, the threshold could be a raw value. For example the threshold could be 100 KB.

In another variant of this embodiment, the threshold may relate to the ratio of the size of the compressed second data and a compressed size of the total data stored in the storage. In other words, a compression algorithm may be applied to the total data stored in the storage, and the processor 133 may compare compressed second data size and the compressed size of the total data stored in the storage.

In a variant of this embodiment, the threshold is a predetermined absolute amount of information. As an example, the threshold (measured in number of bytes of compressed second data) may be predetermined based on an amount of information which can be digested by a human user (i.e. an amount of "human digestible information"). The amount of human digestible information may, for example, be the maximum amount of information that a human user my retrieve for authentic work (and could vary between applications). For example, a human cannot process hundreds of documents at once. Therefore, if hundreds of documents are being simultaneously output to a single user, this would exceed the threshold. Furthermore, different types of threshold can be used in combination. The amount of human digestible information may, for example, be the maximum amount of information that a human user my retrieve for authentic work (and could vary between applications).

In some embodiments, the threshold can be over a long time period (or even ever). An example could be that only 2 MB of pure information can ever be output to a single user. As a result, the accumulated output data can be monitored. This prevents, among other things, sophisticated attackers trying to exfiltrate (i.e. extract) data in what is known as a 'slow and low' mode. However, in regard to the "human digestible information" and other thresholds, as discussed above there can also be reasons to look at the amount of information transmitted in predefined time frames.

The threshold could be user set, or could be determined in other ways. For example, the threshold could be set by a machine learning algorithm. As an example, a machine learning algorithm could continuously adjust the threshold to be a predefined number of standard deviations above the average amount of information in the second data calculated based on other communications in general or by the same recipient in particular and\or in response to the same kind of request.

In addition, in variants of this embodiment, the threshold could be used in conjunction with other parameters and tests on the characteristics of the data (in comparison with the profile for example), the metadata (like who is the user or recipient's IP address etc.) and even insights from the incoming communication. For example, the final decision may take into account the geolocation of the recipient. In another case the existence of personal information or classified data in the content may actually lower the threshold for any practical aspect.

In variants of this embodiment, there could be many such 'first devices' which share a single 'third device'. In other words, there could be a single device (corresponding to the third device) monitoring the output of a plurality of devices (e.g. it could be the router of a local area network). If all outgoing communication from the multiple devices goes through the same device then, in some embodiments, the multiple devices can be treated as a single entity to protect, i.e. as if they are a single server (although with data that is the sum of all data stored on all servers if the threshold is derived from the total amount of stored data).

In other variants, there could be many such clients/users (i.e. many such 'second devices'). In these variants, the 'third device(s)' can determine the amount of aggregated information per client/user and/or the total amount of data leaving the server. Each measure is both useful and relevant. Furthermore, the thresholds for these may change in accordance with the analysis per user or total for all users as a whole.

Once the warning is transmitted to the fourth device 140, the fourth device displays a warning message. For example, the fourth device 140 could be the smartphone of the person in charge of running the website hosted by the first device 110. The warning that a data breach may have occurred could be displayed for the user, notifying them that they should investigate whether a data breach has occurred.

However, embodiments of the present disclosure are not limited to transmitting a warning to another device. In alternative embodiments, the warning could be displayed on the third device instead, or no warning could be issued, and the fact that the threshold has been exceeded could simply be stored, ready for a user to look at, at a later time. In other embodiments, once the threshold has been exceeded, further algorithms could be used to analyse the relevant data to determine if a data breach has occurred.

Furthermore, there could be different levels of warnings and follow-up acts according to the distance from the threshold that was experienced. As discussed with reference to the second embodiment, below, there is also the possibility of blocking the communication. There could also be differences between the reaction to a temporary violation and an aggregated violation because of the different damage potential and implications.

In summary, the first embodiment of the present disclosure performs the following steps: splitting outgoing data into first data which is assumed safe to output and second data for which it is unknown whether or not it is safe to output; determining how much pure information is included in the second data (e.g. by applying a compression algorithm); determining whether the amount of pure information in the second data itself or when aggregated over time is above a threshold amount; and identifying a possible data breach if the amount of information is above the threshold amount.

If the amount of information is above a threshold amount, this indicates that a significant amount of actual information which has not been output before has been output, and therefore that a data breach may have occurred.

As an example, consider the website of a bank. The homepage of a bank's website is hosted on a server (or collection of servers) that is typically accessed multiple times by each user over time. As a result, the processor 133 (usually external to the server) would recognise all data relating to the homepage as first data. This is data which is output so often that it is assumed to be safe to output without any further analysis. This is because once it was revealed in the first place it no longer conveys additional new information to the external world.

However, personal details of a bank's customer (e.g. account balance) may change a little bit every output. As a result, the processor 133 (usually external to the server) would recognise all data relating to the personal data as second data.

In a scenario in which a malicious user (e.g. a hacker) manages to bypass the existing security in place in a covert, they could retrieve\exfiltrate confidential\sensitive data held on the server. In this event, the processor 133 would identify this as second data, and if the hacker was accessing anything that is more than the negligible amount of single user's data, the amount of information would exceed the threshold, and this would be identified as a potential data breach.

As discussed previously, existing security methods aim to look for weaknesses or attacker behaviour, so as to detect where a 'cyber-attack' is occurring. If the specific method used by the hacker was not anticipated, or if the hacker's behaviour did not appear as anticipated, then the attack would not be recognised.

In contrast, the method employed by the first embodiment (and the other embodiments of the present disclosure) is threat-agnostic. In other words, this embodiment does not aim to detect attacker behaviour or try to anticipate where or how an attack might occur. Instead, it monitors all outgoing data and identifies amount of data above the threshold. As a result, the method of this embodiment is able to identify possible data breaches whenever they occur in the system, regardless of the exfiltration method.

Figure 2:
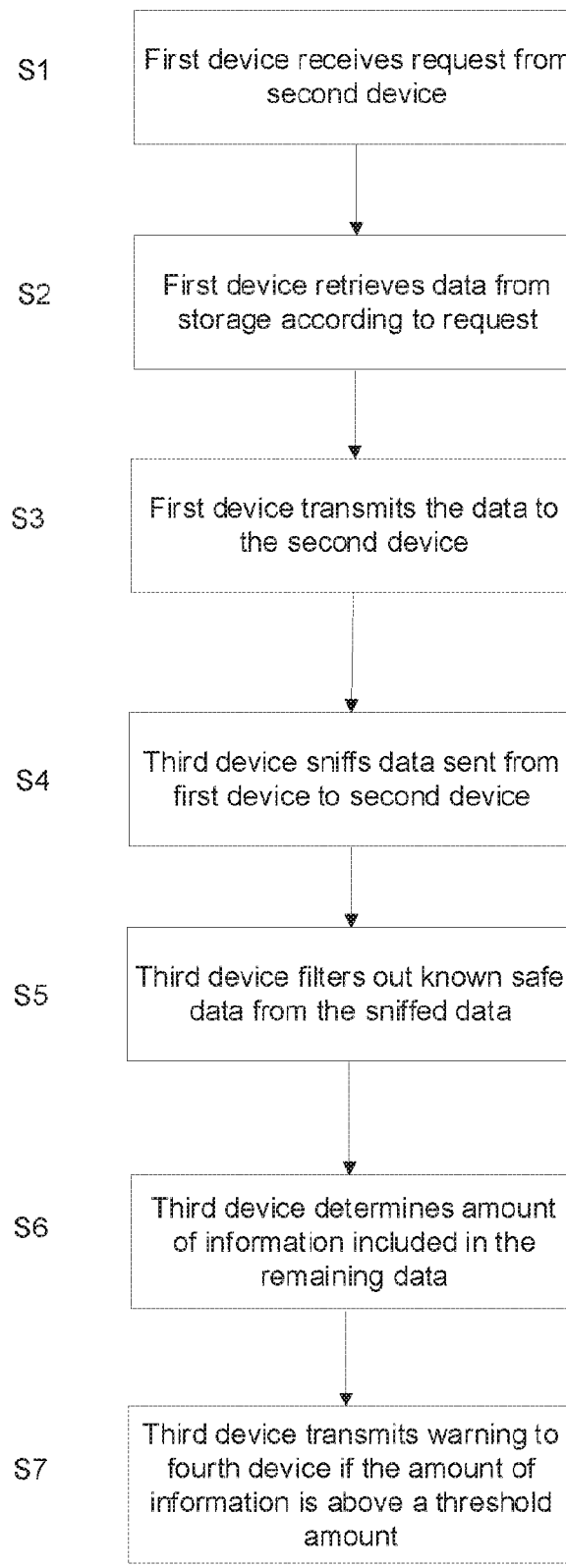
FIG. 2 shows a flow chart of the operation of the first embodiment.

While the first embodiment has been discussed using specific features (i.e. specific devices such as servers and smartphones, and specific methods of determining the first and second data), it will be appreciated that these have only been used to exemplify this overall method, and that embodiments of the present disclosure are not limited to these specific examples In particular, while the first embodiment has been discussed in the context of a server hosting a webpage, it will be appreciated that this is merely exemplary, and that the method of FIG. 2 can be applied to many other scenarios. For example, this could be applied to a remote desktop, in which the second device is accessing the desktop of the first device remotely. In such a scenario, it will be appreciated that step S1 of FIG. 2 is not necessary, and the first device could simply determine that it is to transmit data without receiving a request for the data first.

As mentioned above, the first embodiment filters outgoing data blocks that have been output (recently), and determines the amount of actual information that is left.

Put simply, the first embodiment of the present disclosure provides a method of identifying whether a data breach is likely to have occurred by determining whether a significant amount of information has been output that has not previously been output. Embodiments of the present disclosure are not, however, limited to this and various methods can be used to filter (i.e. remove from the analysis) data that can be assumed to be "safe").

In some embodiments, at step S5 the processor 133 can also filter out the header of each network packet (or message, for higher level network protocols). As is known, a network packet (message) includes both a header and a payload. It can be beneficial to filter out the header (i.e. designate the header as first data), once it is validated not to contain any confidential\sensitive (or new pure) information.

In this case, the processor 133 can analyze the header of the network packet (message) against a pre-defined specification to rule out a potential of a data exfiltration. For example, the validating could include: verifying the existence of a calculated/expected value in fields such as address, checksum, length, etc. in protocols such as Ethernet, Internet Protocol (IP) and Transmission Control Protocol (TCP). Another example includes validating legal field names and values in protocols such as HyperText Transfer Protocol (HTTP) etc.

In some embodiments, this could be the only method of designating first data (i.e. the processor does not filter out any data based on whether it has been output before). However, given that there is generally an order of magnitude between one and three times more data which could be filtered out based on whether it has been output before compared to the amount of data contained in a packet header, it is useful to filter the first data based on whether it has been output before.

In another variant of this embodiment, the processor 133 can also filter out (i.e. designate as first data) response data which matches a genuine authorized client request. In this case, the system includes an external trusted module which provides a digital signature on both the payload of the server response, and the user request (i.e. the request received at step S1 in FIG. 2, from the second device of FIG. 1).

Furthermore, other embodiments may use other appropriate ways of flagging certain stored data as "safe" (e.g. even if it has never been sent before). Such embodiments may use a module (for example AI-based or maybe even less sophisticated rule-based algorithms) to provide clearance for some data portions.

The above embodiments have been discussed generally, with respect to a network packet (message) and payload. However, it will be appreciated that in practical implementations of embodiments of the disclosed embodiments, the processor 133 can be implemented on any layer of the network model being used (e.g. any of the seven layers on the Open Systems Interconnection (OSI) model), in accordance with any such suitable protocol (e.g. Ethernet, IP, TCP, HTTP etc.).

Figure 3:
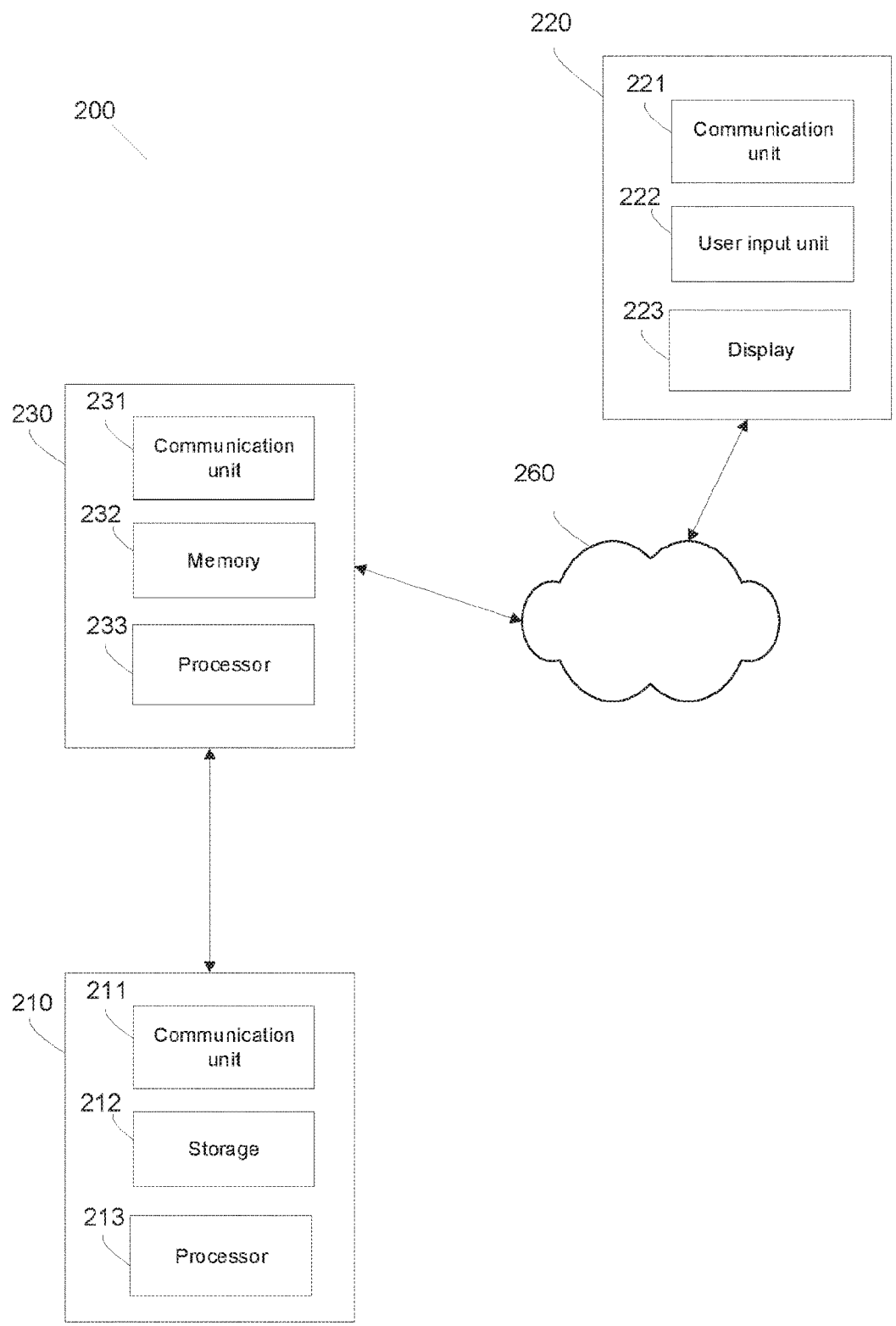
FIG. 3 shows a schematic illustration of a system according to a second embodiment of the present disclosure.

FIG. 3 shows a system 200 according to a second embodiment. In comparison to the first embodiment, which focused on identifying a potential data breach, the second embodiment also aims to block (prevent) the data breach in the first place.

The system 200 comprises a first device 210, a second device 220, and a third device 230. Similarly to the first embodiment, the devices can communicate with each other over a network 260. Specifically, the first device 210 can communicate with the second device 220 via the third device 230. In other words, in order for data to be sent from the first device 210 to the second device 220, the data is actually\practically first sent from the first device 210 to the third device 230, and then from the third device 230 to the second device 220 over the network 260. It will be appreciated that in practical implementations of embodiments of the present disclosure there may be many such devices, but three such devices will be described in relation to FIG. 3 for ease of explanation.

The first device 210 comprises a communication unit 211, a storage 212, and a processor 213. In this embodiment, the first device 210 is a server of a company, and holds various confidential\sensitive information related to the company. The first device 210 can also be configured to provide a remote desktop for the second device 220. In other words, while providing a remote desktop, the first device 210 is transmitting a video feed (via the third device 230) to the second device 220 of its desktop, while the second device 220 is transmitting control commands (e.g. from a connected mouse and keyboard) to the first device 210.

However, it will be appreciated that this is merely exemplary. For example, in a variant of this embodiment the first device could be acting as a website host (i.e. as in the first embodiment). In other words, in other embodiments (or variants of this embodiment), the first device 210 could be any type of electronic device (e.g. smartphone, PC, tablet, laptop. etc.) capable of transmitting any type of data (e.g. videos, music, documents, personal data etc.).

In this embodiment, the communication unit 211 is configured to communicate with the second device 220 via the third device 230. Specifically, the communication unit 211 is configured to receive control commands from the second device 220 via the network 260 (e.g. input by a user using a mouse and keyboard at the second device 220), and to transmit data to the second device 220 (via the third device 230) to allow the second device 220 to display a remote desktop.

In this embodiment, the processor 213 is configured to process and act upon the control commands received from the second device 220 via the network 260, and to control the communication unit 211 to output new data allowing the second device 220 to display a remote desktop. In other words, the processor 213 is configured to control the communication unit 211 to output a constant data steam, allowing the second device 220 to display a remote desktop.

The second device 220 is a device capable of communicating with the first device 210 (via the network 260). In this embodiment, the second device is a PC. However, embodiments of the present disclosure are not limited to this and the second device could be any suitable computing device (e.g. server, smartphone, tablet, laptop. etc.).

In this embodiment, the second device 220 comprises a communication unit 221, a user input unit 222 and a display 223. The communication unit 221 is configured to communicate with the first device 210 via the network 260. Specifically, the communication unit 221 is configured to receive data from the first device 210 (via the third device 230) allowing the display 223 to display a remote desktop image, and to transmit control commands received by the user input unit 222, to the first device 210 (via the network 260). The user input unit could be device capable of receiving a user input, such as a mouse or a keyboard.

The third device 230 comprises a communication unit 231, a memory 232, and a processor 233. The third device 230 is a device capable of communicating with each of the first device 210 and the second device 220 using the communication unit 231. In this embodiment, the third device 230 is acting like a router which can communicate with the first device 210 over a local area network, and communicate with the second device 220 via the network 260 (e.g. the Internet). The third device 230, for example, could be a router or a component part of a router (or other similar device). However, embodiments of the present disclosure are not limited to this, and the third device could be any suitable computing device (e.g. server, PC, laptop. etc.).

In this embodiment, the memory 232 is configured to store information regarding data blocks that have previously been output by the first device 210 over the network, similarly to the memory 132 of the first embodiment.

The processor 233 is similar in purpose to the processor 133 of the first embodiment. In other words, the processor 233 removes a portion of the output data from future analysis that can be considered to be safe. However, differently to the first embodiment (where the processor 133 worked in parallel to the output of data from the storage 112 to the second device 120 via the communication unit 111), the processor 233 of this embodiment works in series with the flow of output data (i.e. it is installed inline rather than passively monitoring). As discussed in detail later, the processor 233 manipulates the data before it is output, allowing the output to be considered clear from data exfiltration potential.

As with the first embodiment, the network 260 in this embodiment is the Internet, but embodiments of the present disclosure are not limited to this.

This embodiment of the present disclosure (i.e. the second embodiment) provides a method for preventing a data breach from occurring, based on controlling the amount of not "safe" information that is being output by a device.

Figure 4:
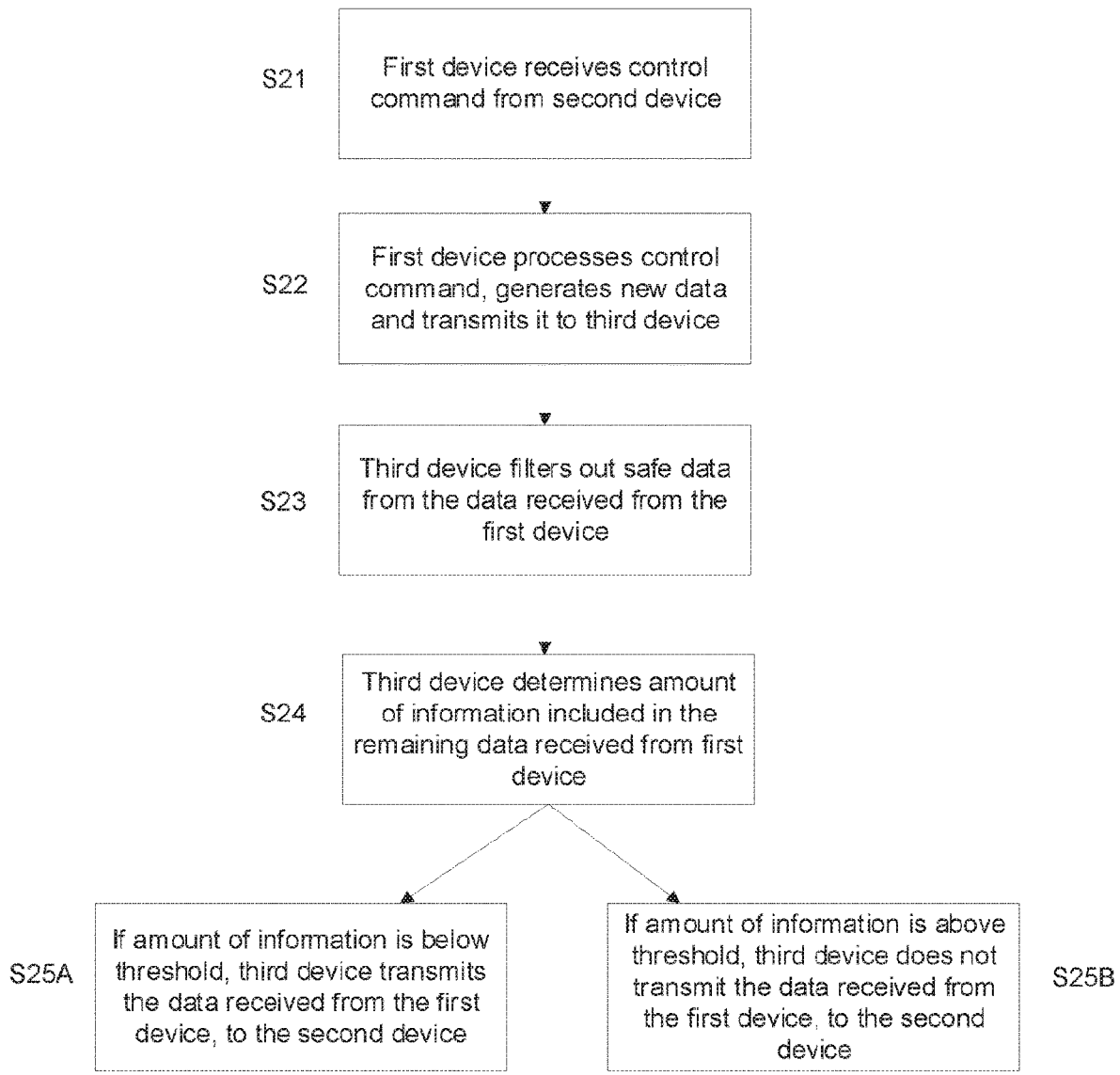
FIG. 4 shows a flow chart of the operation of the second embodiment.

The operation of the embodiment discussed in relation to FIG. 3 will be explained in relation to the flow chart of FIG. 4, which shows operations of the first to third devices.

At step S21, the first device 210 receives a control command from the second device 220 via the network 260. For example, a user may have used a mouse at the second device 220 to click an icon, and this command is then transmitted to the first device 210 via the network 260.

At step S22, the processor of the first device 210 processes the control command and generates new data to transmit to the second device 220 to allow the second device 220 to display a remote desktop image, and transmits it to the third device 230 (i.e. the 'router"), so that the third device 230 can then transmit the data to the second device 220. However, the third device 230 may not actually transmit this data to the second device 220 in some circumstances, as discussed below.

Steps S23 and S24 correspond to steps S5 and S6 of FIG. 2. In these steps the processor 233 analyzes the data to be output to the second device 220 by splitting it into first data and second data, and determining the amount of pure information included in the second data, as a representation of how much information is to be output. However, a key difference from the first embodiment, is that these steps are performed prior to the data being output to the second device 220 (i.e. the client).

Also, in addition to any of the filtering methods mentioned above (e.g. filtering previously sent data blocks or recognising that data is "safe" as a result of a digital certificate or otherwise), the video data associated with the remote desktop can be transformed/manipulated so as to scramble any possible covert messages that may be hidden in the video stream.

Specifically, the format of the binary payloads of network protocols can be manipulated/transformed so as to scramble covert messages in a non-reversed manner, while ensuring that user experience is not interfered with. In relation to the remote desktop example (in which the data stream sent from the first device to the second device is effectively a video stream), the video stream can be converted from one format to another, for example from WMV to MP4 This ensures that any covert message included in the video stream is scrambled, while ensuring that the remote desktop can still be displayed at the second device.

In this embodiment, the processor 233 can then treat this transformed data as first data (since any covert messages are then scrambled), and exclude it from the compression of the second data to end up with a reduced amount of overall pure information.

At step S25 (i.e. step S25A or step S25B), the processor 233 determines whether the amount of information (resulting from the data compression algorithm) is above a threshold, in the same or similar way as steps S6-S7 of FIG. 2. At step S25A (i.e. if the amount of information is below the threshold), the third device 230 transmits the data received from the first device 210, to the second device 220. However, in step S25B (i.e. if the amount of information is above the threshold) instead of transmitting a warning (as was the case in the first embodiment), the third device 230 prevents the data from being output to the second device as it is inline with the output data. In other words, the third device 230 does not transfer the data to the second device 220.

In a variant of this embodiment, if the amount of information is above the threshold, the processor 233 calls a display to display a warning that a large volume of new information (i.e. information that was not previously output) is to be output, optionally requesting confirmation from a user that this information can be sent. In some embodiments, the warning also displays a representation of the data to be output to the user, so that he can review it. The displaying could take place in the first device, the third device, or another device (e.g. a user's smartphone).

While the second embodiment has been discussed in relation to a remote desktop scenario, it will be appreciated that this is merely to exemplify the overall teaching, and for ease of explanation. It will be appreciated that variants of the second embodiment can be used in any other suitable scenario which includes the output of data from one device to another device including but not limited to any other format of stream protocols and\or payloads of binary formats. Furthermore, while the second embodiment uses scrambling as part of the filtering, other embodiments are not limited to this and any one or combination of the filtering methods discussed herein could be used in embodiments that employ prevention.

In particular, as discussed above, in comparison to the first embodiment in which the third device 130 identifies a possible data breach by analysing outgoing data in parallel to the transmission of the outgoing data, in the second embodiment the analysis of the outgoing data is performed in series with the flow of outgoing data. Based on the result of the analysis, the third device of the second embodiment can prevent the data from being output until it has been determined as safe (e.g. by a user), and therefore prevent a data breach from occurring.

In summary, the second embodiment of the present disclosure performs the following steps: splitting outgoing data into first data which is assumed safe to output, including parts that were proactively manipulated, and second data for which it is unknown whether or not it is safe to output; determining how much information is included in the second data (e.g. by applying a compression algorithm); determining whether the amount of information in the second data itself or when aggregated over time is above a threshold amount; and preventing the data from being output if the amount of information is above a threshold amount.

The use of series data analysis allows prevention (blocking), and therefore can be preferable to the identification performed by the parallel monitoring. However, the series analysis also requires an inline communications path as opposed to passive observation, and therefore is more complicated to implement.

As discussed above, the third device 230 is installed between the first device 210 and the network 260, and the first device 210 can communicate with the second device 220 via the third device 230. Hence, outgoing data from the first device 210 passes through the third device 230. In the above embodiment, there is no need for data from the second device 220 to pass through the third device 230. However, in some embodiments, the third device 230 can be operable to receive/retransmit all data sent between the first device 210 and the second device 220. This can, for example, enable the third device 230 to log user sessions and retrieve some parameters to fine tune the decision making as explained in the third embodiment.

It will be appreciated that the variants discussed with reference to the first embodiment can also be applied to the second embodiment.

A third embodiment of the present disclosure will now be discussed. In the third embodiment, a filter is implemented as a software appliance.

The filter can be installed inline (i.e. in series) or in parallel with a communication channel according to the required mode. If the required mode is preventing/blocking a data breach, the filter may be installed in series, whereas if the required mode is identifying a possible data breach so that an alarm can be raised, the filter may be in parallel with the communication channel. However, embodiments of the present disclosure are not limited to this (e.g. the filter could be in series even if the required mode is identifying).

The filter is configured to analyze any byte that is sniffed from the wire (i.e. from the communication channel) in any or any combination of the layers of the network communication model being used (e.g. the seven layers of the network communication model).

In this embodiment, the filter monitors the outgoing communication. In other words, the filter screens the outgoing communication (from a given device). In this embodiment, the screening process involves each of the following five functions. However, it will be appreciated that, according to the context, in other embodiments, just one, or a combination of, these functions could be used instead.

In the first function, the filter validates protocol header values of each network packet in the outgoing communication against the specification to rule out exfiltration potential. Examples of this validation include verifying the existence of calculated/expected values in fields like address, checksum, length, constant\reserved etc. in protocols like Ethernet, IP, TCP etc., as well as validating legal field names and values in protocols like HTTP etc.

The second function includes filtering protocol payloads that match genuine authorized client requests. For this purpose, an external trusted model is used to provide a digital signature on the payload and the associated verified user request, so as to allow the filter to identify which untouched payloads of network protocols match genuine authorised client requests.

The third function includes filtering out known data blocks in the protocol payload that carry no new information. For this purpose, the filter maintains a repository of resulting hash function calculations of any data block that was transferred through during system operation. In other words, when a data block is output, a hash function is applied, and the resulting hash is stored in the repository so that, if that data block is later output again, the filter can determine whether it has already been output by applying a hash function to it and looking up in the hash repository.

Examples of such data blocks include complete files, pages etc. in any format that are downloaded or sent by any protocol; complete files that are embedded within other frames like a file in a compressed archive, an object within a document etc., or designated sections within files, pages etc. like HTML elements, textual paragraphs, frames in a video stream etc.

The fourth function includes manipulating or transforming the format of binary payloads (to be output) to scramble any possible covert messages in a non-reversed manner but without interfering with user experience. For example the fourth function could include transforming a video stream from one format to another or changing the least significant bits in an image array to a random value, etc.

Finally, the fifth function involves compressing the remaining bytes of data to be output that were not validated or manipulated using the first to fourth functions. This computes the minimal number of bytes that are required to carry the same amount of information (according to the Information Theory) by an LZ-like compression algorithm adjusted to the characteristics of the relevant communication protocol or an Edit Distance-like algorithm to compute the difference from a previously sent similar data block. This represents how much 'new' information is to be output. If the amount of 'new' information is above a predetermined threshold, then the filter can raise an alarm or prevent the data from being output.

In other words, a filter can be implemented as a software application to apply a combination of the first to fifth functions to identify and/or prevent\block potential data breaches from occurring based among other on the filter's ability to distinguish between rather new and already familiar data in a given parsed session.

Figure 5:
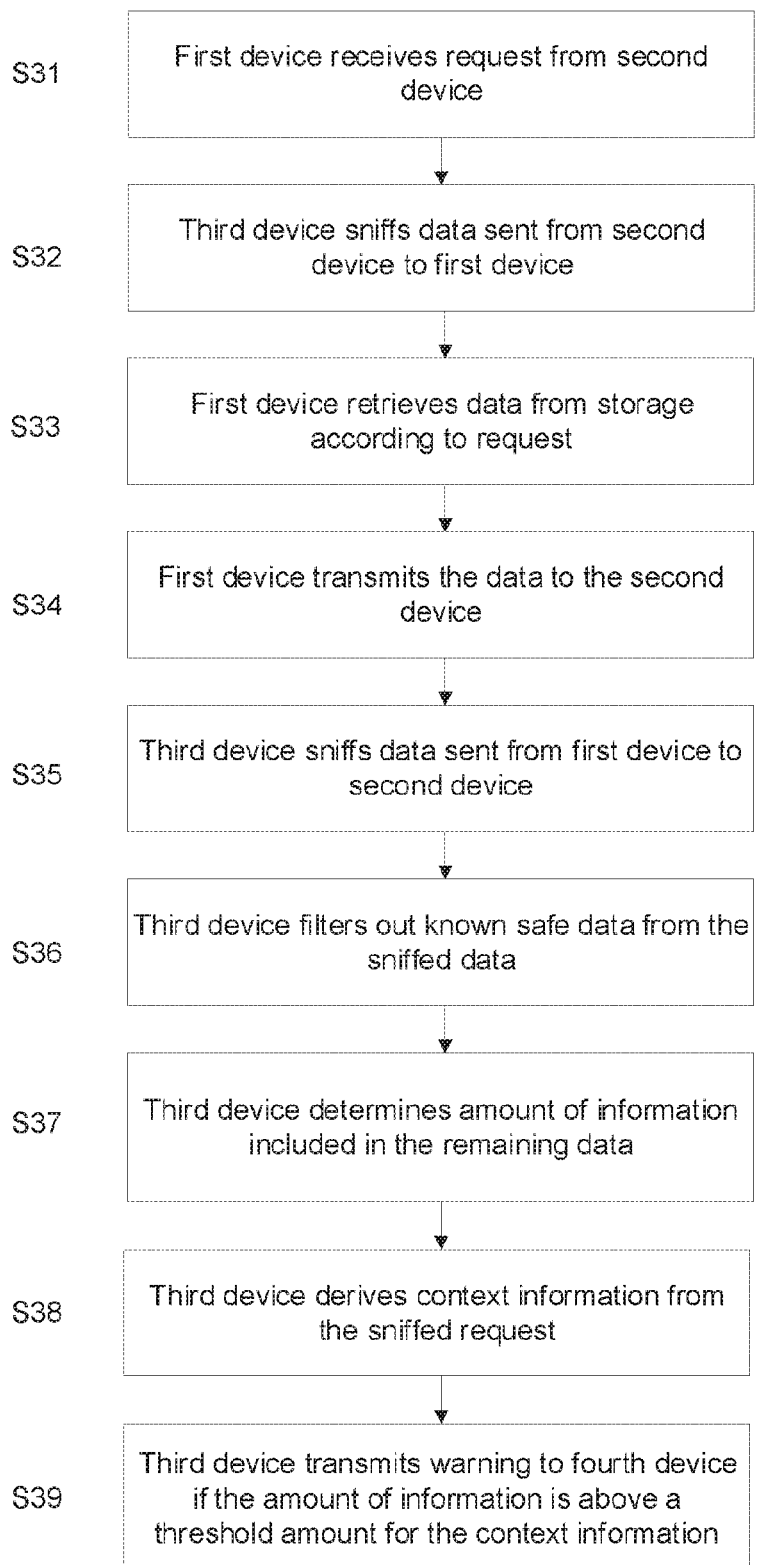
FIG. 5 shows a flow chart of the operation of a third embodiment.

The operation of a third embodiment will be explained in relation to the flow chart of FIG. 5, which shows operations of the first to third devices shown in FIG. 1. In other words, the third embodiment can be implemented using the same devices as the first embodiment (though the third embodiment is not limited to this).

At step S31, the communication unit 111 of the first device 110 receives a request for data from the second device 120. This step is equivalent to step S1 of FIG. 2, and like that step is optional.

At step S32 the third device 130 'sniffs' the data sent from the second device 120 to the first device 110 in the request in step S31. In other words, the third device 130 also receives a copy of the data sent from the second device 120 to the first device 110 in the request in step S31. This step corresponds to the third device (e.g. a computing device) analysing incoming data to the first device 110 (e.g. a server) sent over the network 160. This step has no equivalent in FIG. 2.

At step S33, the processor 113 of the first device 110 processes the request for data. Specifically, the processor 113 analyzes the request and retrieves the relevant data blocks from the website data stored in the storage 112. In other words, the processor 113 retrieves the data blocks necessary for providing the requested webpage to the second device 120. This step is equivalent to step S2 of FIG. 2.

At step S34, the processor 113 controls the communication unit 111 to transmit the retrieved data blocks to the second device 120, to allow the second device 120 to display the requested webpage. The data blocks are sent within network packets making up a data stream, each network packet comprising a header and a payload. This step is equivalent to step S3 of FIG. 2.

At step S35 the third device 130 'sniffs' the data sent from the first device 110 to the second device 120 in step S34. In other words, the third device 130 also receives a copy of the data sent from the first device 110 to the second device 120. This step corresponds to the third device (e.g. a computing device) analysing outgoing data from the first device 110 (e.g. a server) sent over the network 160. This step is equivalent to step S4 of FIG. 2.

At step S36, the processor 133 of the third device 130 filters each block of the data stream (i.e. the data sniffed by the third device) by splitting the data stream into first data and second data. The first data is data that the processor 133 considers safe to output. This step corresponds to the third device (e.g. a computing device) filtering (e.g. removing or ignoring) a portion of the outgoing data (i.e. first data) to determine a remaining portion of the outgoing data (i.e. second data). This step is equivalent to step S5 of FIG. 2.

The processor 133 filters out (i.e. ignores) the first data, and retains the second data for step S37.

At step S37, the processor 133 determines how much information is included in the second data. This step corresponds to the third device (e.g. a computing device) analysing the second data (remaining portion of the outgoing data after filtering) to determine the amount of information in the second data. This step is equivalent to step S6 of FIG. 2.

In some embodiments, the processor 133 performs step S37 by applying an Edit Distance (or Edit Distance-like) or other resemblance estimation algorithm to measure the difference between the second data and a similar block that has previously been output by the first device. Applying such an algorithm enables the processor 133 to assume a normalised number of bytes of data needed to provide all of the information included in the second data. This can then be compared against external thresholds and/or input to an anomaly analyzer to determine the amount of pure information in outgoing traffic and to identify actual data loss.

As an example, the compared block may include a document with a certain template, where the difference between two distinct copies that are addressed to different recipients is the length of the internal field that contains the name of the recipient.

At step S38 (which has no equivalent step in FIG. 2), the processor 133 retrieves various parameters from both the sniffed data from second device 120 to first device 110 (i.e. in the request obtained in step S32) and the sniffed data from first device to second device (i.e. in the response obtained in step S35) to derive context information relating to the current session. As explained below, in this embodiment, the "context information" is used to determine the context of the interaction between the first and second devices.

As an example, the "context information" may refer but it is not limited to a combination of the following characteristics: the name of the user who initiated the request, the IP address of the second device, any unique communication identifier of the second device, the date and\or time of the day of the session (e.g. the session started by the request in S31), the specific service\path\request name in the first device that the second device was targeting.

At step S39 (similar to step S7 of FIG. 2), the third device 130 performs a predetermined action if the amount of information in the second data (i.e. the remaining portion of the outgoing data after filtering) is over a threshold, with the threshold being set based on the "context information". In other words, the information on the context of the interaction between the first and second devices is used to determine the threshold.

As an example, one may consider an online banking website where remote clients may query their account balance. In this case the threshold on the normal expected new amount of information for a private user could be in the magnitude of several KB while for a business account holder it may be several dozens of KB. In other words, the system could determine from the request in step S31 what type of user (e.g. a private user or a business account holder) was making the request as context information, with this context information being used to determine the threshold for step S39.

In some embodiments, the threshold in use at step S39 would be machine-learned from the profile of previous sessions in the same context.

In some embodiments, the threshold in use at step S39 would refer to the total amount of accumulated information over several sessions in the same context or a set of contexts.

In some embodiments, the threshold in use at step S39 would change according to the level of risk estimated to the current session by an external module.

As discussed in detail above, embodiments of the present disclosure provide a computer network filter (or processor) that calculates the amount of information that streams in a communication channel. In some embodiments, the information is defined as the number of bytes that could carry new useful data for a malicious actor attempting to exfiltrate data from a system/server/segment/cloud connected to the other side of the communication channel.

The described technology can validate that in every time stamp the amount of pure (unique) information that transfers in a given data stream or communication channel does not exceed a predefined threshold and hence act as a deterministic data loss/leakage prevention (DLP) system that prevents any kind of data breach attempt as it is threat agnostic. In other words, the filter/processor of the present disclosure
  assumes nothing on the attacker or the attack vector, and
  it monitors any byte that leaves the system.

The discussed embodiments are different from existing DLP solutions that usually require pre-classification or policy definition of protected data and identify only structured data that is not exfiltrated in covert channel. As discussed previously most of the existing approaches for data protection (anti-theft/exfiltration) rely on detecting either the attacker or the act of penetration first. The threat agnostic nature of the present disclosure allows all outgoing data to be monitored, without need to try to detect an attacker or a point of penetration.

In alternative embodiments, the method could comprise manipulating/transforming the binary payloads of the data instead of or in addition to filtering it into first and second data, and determining the amount of new information to be output. In other words, in an alternative embodiment, instead of using a data analyzer, a data manipulator could be used instead or as an add-on. By manipulating all of the data to be output (e.g. by transforming its format), covert messages in all of the data can be scrambled. This alone can prevent a data breach, without the need for also analyzing the data to try to identify a breach. However, a combination of both data manipulation and data analysis can result in an even more secure data loss prevention (DLP) system. In particular, the use of the data manipulation/scrambling can help to prevent sensitive information from being released from sites that broadcast TV or radio, as well as pure Voice over Internet Protocol (VOIP) systems that do not have file transfer protocols.

As discussed, embodiments of the present disclosure can provide a computer implemented method of monitoring data output by a server over a network, wherein the server is arranged to store data, the method comprising: analysing, by a computing device, outgoing data from the server sent over the network; filtering, by the computing device, a portion of the outgoing data to determine a remaining portion of the outgoing data; analysing, by the computing device, the remaining portion of the outgoing data to determine the amount of information in the remaining portion of the outgoing data; and performing, by the computing device, a predetermined action if the amount of information in the remaining portion of the outgoing data is over a threshold.

The filtering may comprise splitting the outgoing data into first data that is considered to be to output, and second data which is the remaining data.

Embodiments of the present disclosure can also provide a computer-readable medium having computer-executable instructions to cause one or more processors of a computing device to carry out the method of any of the embodiments of the present disclosure.

Embodiments of the present disclosure can also provide a computing device comprising: one or more processors; and a memory operable to store data output by a server over a network, the memory being further operable to store operating instructions to control the one or more processors to: analyse the outgoing data from the server sent over the network; filter a portion of the outgoing data to determine a remaining portion of the outgoing data; analyse the remaining portion of the outgoing data to determine the amount of information in the remaining portion of the outgoing data; and perform a predetermined action if the amount of information in the remaining portion of the outgoing data is over a threshold.

The computing device may be implemented as a single device or as a distributed device. The computing device could be any suitable computing device (e.g. router, server, PC, tablet, laptop. etc.). The server may be any single or distributed device suitable for holding data and capable of sending that data over a network. For example, the server may act as a data repository. Any suitable network could be used.

It will be appreciated that the functionality of each of the components discussed can be combined in a number of ways other than those discussed in the foregoing description. For example, in some embodiments, the functionality of more than one of the discussed devices can be incorporated into a single device. In other embodiments, the functionality of at least one of the devices discussed can be split into a plurality of separate devices.

Conditional language such as "may", is generally used to indicate that features/steps are used in a particular embodiment, but that alternative embodiments may include alternative features, or omit such features altogether.

Furthermore, the method steps are not limited to the particular sequences described, and it will be appreciated that these can be combined in any other appropriate sequences. In some embodiments, this may result in some method steps being performed in parallel. In addition, in some embodiments, particular method steps may also be omitted altogether.

While certain embodiments have been discussed, it will be appreciated that these are used to exemplify the overall teaching of the present disclosure, and that various modifications can be made without departing from the scope of the disclosed embodiments. The scope of the disclosed embodiments should is to be construed in accordance with the appended claims and any equivalents thereof.

Many further variations and modifications will suggest themselves to those versed in the art upon making reference to the foregoing illustrative embodiments, which are given by way of example only, and which are not intended to limit the scope of the disclosed embodiments, that being determined by the appended claims.

The invention claimed is:

1. A computer implemented method of monitoring data output by a server over a network, wherein the server is arranged to store data, the method comprising:
   analyzing, by a computing device, outgoing data from the server sent over the network;
   filtering, by the computing device, a portion of the outgoing data that is safe to output from the server, to obtain a remaining portion of the outgoing data whose safety to output from the server is unknown;
   analyzing, by the computing device, the remaining portion of the outgoing data to determine a value indicating information complexity in the remaining portion of the outgoing data by applying an algorithm to the remaining portion of the outgoing data;
   determining, by the computing device, when the remaining portion of the outgoing data is unsafe to output from the server based on the value indicating information complexity in the remaining portion of the outgoing data being over a threshold; and
   performing, by the computing device, a predetermined action when the determination indicates the remaining portion of the outgoing data is unsafe.

2. The method of claim 1, wherein the filtering comprises filtering data of the server that has been sent over the network previously to obtain the remaining portion of the outgoing data,
   wherein the filtering data of the server that has been sent over the network previously comprises at least one of: filtering data that has been sent before by the server to any recipient, filtering data that has been sent before by the server to an intended recipient of the outgoing data, and considering data that has been sent by the server in a predetermined time period.

3. The method of claim 1, further comprising:
   analyzing, by the computing device, the server to categorize the data stored in the server into a plurality of data blocks;
   storing, by the computing device, record data indicating which data blocks of the plurality of data blocks stored in the server are data blocks that have been sent over the network previously; and
   wherein the filtering comprises filtering the data blocks that have been sent over the network previously to obtain the remaining portion of the outgoing data.

4. The method of claim 1, further comprising:
   analyzing, by the computing device, the outgoing data to determine a data format of a portion of the outgoing data; and
   changing, by the computing device, the data format of the portion of the outgoing data,
   wherein the filtering comprises filtering the portion of the outgoing data with a changed data format to obtain the remaining portion of the outgoing data, wherein the analyzing the outgoing data to determine the data format of the portion of the outgoing data comprises checking header information of the outgoing data, and wherein the changing the data format of the portion of the outgoing data comprises altering at least part of the portion of the outgoing data.

5. The method of claim 1, further comprising:

analyzing, by the computing device, the outgoing data to determine a portion of the outgoing data that comprises protocol header values, wherein the filtering comprises filtering the portion of the outgoing data that comprises protocol header values to obtain the remaining portion of the outgoing data.

6. The method of claim 1, further comprising:

analyzing, by the computing device, the outgoing data to determine a portion of the outgoing data that is safe to output from the server by using an external trusted model, wherein the portion of the outgoing data that is safe to output from the server is associated with a genuine response to a verified user request for data.

7. The method of claim 1, wherein the analyzing the remaining portion of the outgoing data to determine the value indicating information complexity in the remaining portion of the outgoing data comprises:

applying, by the computing device, a compression algorithm to the remaining portion of the outgoing data to obtain a compressed remaining portion of the outgoing data;

comparing, by the computing device, the compressed remaining portion of the outgoing data to a predetermined threshold; and performing, by the computing device, the predetermined action if a size of the compressed remaining portion of the outgoing data is over the predetermined threshold, wherein the value indicating information complexity in the remaining portion of the outgoing data is determined based on the size of the compressed remaining portion of the outgoing data, wherein the predetermined threshold comprises an absolute number determined based on a threshold related to an amount of human digestible information, and wherein the predetermined threshold is determined based on a ratio of the size of the compressed remaining portion of the outgoing data and a total size of the data stored in the server, or a ratio of the size of the compressed remaining portion of the outgoing data and a compressed size of the data stored in the server.

8. The method of claim 1, wherein the predetermined action comprises:

providing, by the computing device, an alert that there is a potential data breach, wherein the providing the alert comprises:

sending, by the computing device, information indicating the alert to an external device and/or displaying, on a display of a computing device, information indicating the alert.

9. The method of claim 1, wherein the computing device is arranged to be installed between the server and the network, the method further comprising:

receiving, by the computing device, outgoing data from the server that is intended to be sent over the network; and sending, by the computing device, the outgoing data to the network if the predetermined action is not performed, wherein the predetermined action comprises not sending the outgoing data to the network.

10. A non-transitory computer-readable medium having computer-executable instructions to cause one or more processors of a computing device to:

analyze outgoing data from a server sent over a network;

filter a portion of the outgoing data that is safe to output from the server, to obtain a remaining portion of the outgoing data whose safety to output from the server is unknown;

analyze the remaining portion of the outgoing data to determine a value indicating information complexity in the remaining portion of the outgoing data by applying an algorithm to the remaining portion of the outgoing data;

determine when the remaining portion of the outgoing data is unsafe to output from the server based on the value indicating information complexity in the remaining portion of the outgoing data being over a threshold; and perform a predetermined action when the determination indicates the remaining portion of the outgoing data is unsafe.

11. The non-transitory computer-readable medium of claim 10, wherein the computer-executable instructions further comprise instructions to cause the one or more processors to:

filter data of the server that has been sent over the network previously to obtain the remaining portion of the outgoing data, wherein the filtering the data of the server that has been sent over the network previously comprises at least one of:

filtering data that has been sent before by the server to any recipient, filtering data that has been sent before by the server to an intended recipient of the outgoing data, and considering data that has been sent by the server in a predetermined time period.

12. The non-transitory computer-readable medium of claim 10, wherein the computer-executable instructions further comprise instructions to cause the one or more processors to:

analyze the outgoing data to determine a portion of the outgoing data that is safe to output from the server by using an external trusted model, wherein the portion of the outgoing data that is safe to output from the server is associated with a genuine response to a verified user request for data.

13. The non-transitory computer-readable medium of claim 10, wherein the computer-executable instructions further comprise instructions to cause the one or more processors to:

apply a compression algorithm to the remaining portion of the outgoing data to obtain a compressed remaining portion of the outgoing data;

compare the compressed remaining portion of the outgoing data to a predetermined threshold and perform the predetermined action if a size of the compressed remaining portion of the outgoing data is over the predetermined threshold, wherein the value indicating information complexity in the remaining portion of the outgoing data is determined based on the size of the compressed remaining portion of the outgoing data, wherein the predetermined threshold comprises an absolute number determined based on a threshold related to an amount of human digestible information, and wherein the predetermined threshold is determined based on a ratio of the size of the compressed remaining portion of the outgoing data and a total size of the data stored in the server, or a ratio of the size of the compressed remaining portion of the outgoing data and a compressed size of the data stored in the server.

14. A computing device comprising:

one or more processors; and a memory operable to store data output by a server over a network, the memory being further operable to store operating instructions to control the one or more processors to:

analyze outgoing data from the server sent over the network;

filter a portion of the outgoing data that is safe to output from the server, to obtain a remaining portion of the outgoing data whose safety to output from the server is unknown;

analyze the remaining portion of the outgoing data to determine a value indicating information complexity in the remaining portion of the outgoing data by applying an algorithm to the remaining portion of the outgoing data;

determine when the remaining portion of the outgoing data is unsafe to output from the server based on the value indicating information complexity in the remaining portion of the outgoing data being over a threshold; and perform a predetermined action when the determination indicates the remaining portion of the outgoing data is unsafe.

15. The computing device of claim 14, wherein the operating instructions further control the one or more processors to:

filter data of the server that has been sent over the network previously to obtain the remaining portion of the outgoing data, wherein the filtering the data of the server that has been sent over the network previously comprises at least one of:

filtering data that has been sent before by the server to any recipient, filtering data that has been sent before by the server to an intended recipient of the outgoing data, and considering data that has been sent by the server in a predetermined time period.

16. The computing device of claim 14, wherein the operating instructions further control the one or more processors to:

analyze the outgoing data to determine a portion of the outgoing data that is safe to output from the server by using an external trusted model, wherein the portion of the outgoing data that is safe to output from the server is associated with a genuine response to a verified user request for data.

17. The computing device of claim 14, wherein the operating instructions further control the one or more processors to:

apply a compression algorithm to the remaining portion of the outgoing data to obtain a compressed remaining portion of the outgoing data;

compare the compressed remaining portion of the outgoing data to a predetermined threshold; and perform the predetermined action if a size of the compressed remaining portion of the outgoing data is over the predetermined threshold, wherein the value indicating information complexity in the remaining portion of the outgoing data is determined based on the size of the compressed remaining portion of the outgoing data, wherein the predetermined threshold comprises an absolute number determined based on a threshold related to an amount of human digestible information, and wherein the predetermined threshold is determined based on a ratio of the size of the compressed remaining portion of the outgoing data and a total size of the data stored in the server, or a ratio of the size of the compressed remaining portion of the outgoing data and a compressed size of the data stored in the server.

18. A system of monitoring data output by a server over a network, the system comprising memory comprising programmed instructions stored thereon and a processor configured to be capable of executing the stored programmed instructions to:

analyze outgoing data from the server sent over the network;

filter a portion of the outgoing data that is safe to output from the server, to obtain a remaining portion of the outgoing data whose safety to output from the server is unknown;

analyze the remaining portion of the outgoing data to determine a value indicating information complexity in the remaining portion of the outgoing data by applying an algorithm to the remaining portion of the outgoing data;

determine when the remaining portion of the outgoing data is unsafe to output from the server based on the value indicating information complexity in the remaining portion of the outgoing data being over a threshold; and perform a predetermined action when the determination indicates the remaining portion of the outgoing data is unsafe.

19. The system of claim 18, wherein the processor is further configured to be capable of executing the stored programmed instructions to:

filter data of the server that has been sent over the network previously to obtain the remaining portion of the outgoing data, wherein the filtering the data of the server that has been sent over the network previously comprises at least one of:

filtering data that has been sent before by the server to any recipient, filtering data that has been sent before by the server to an intended recipient of the outgoing data, and considering data that has been sent by the server in a predetermined time period.

20. The system of claim 18, wherein the processor is further configured to be capable of executing the stored programmed instructions to:

apply a compression algorithm to the remaining portion of the outgoing data to obtain a compressed remaining portion of the outgoing data;

compare the compressed remaining portion of the outgoing data to a predetermined threshold; and perform the predetermined action if a size of the compressed remaining portion of the outgoing data is over the predetermined threshold, wherein the value indicating information complexity in the remaining portion of the outgoing data is determined based on the size of the compressed remaining portion of the outgoing data, wherein the predetermined threshold comprises an absolute number determined based on a threshold related to an amount of human digestible information, and wherein the predetermined threshold is determined based on a ratio of the size of the compressed remaining portion of the outgoing data and a total size of the data stored in the server, or a ratio of the size of the compressed remaining portion of the outgoing data and a compressed size of the data stored in the server.

* * * * *